United States Patent Office 3,031,252
Patented Apr. 24, 1962

3,031,252
PROCESS FOR DYEING POLYHYDROXYLATED MATERIALS AND PREPARATIONS THEREFOR
Max Staeuble and Peter Stahel, Basel, Switzerland, assignors to Ciba Company, Inc., Fair Lawn, N.J.
No Drawing. Filed Apr. 7, 1958, Ser. No. 726,639
Claims priority, application Germany Apr. 18, 1957
8 Claims. (Cl. 8—34)

This invention provides a process for dyeing polyhydroxylated materials, such as textile materials of polyvinyl alcohol or especially of cellulose, with compounds capable of being vatted, which contain at least one hydrophilic group and at least one group capable of being chemically fixed, wherein at least one stage of the process is carried out in the presence of a reducing agent.

As compounds capable of being vatted there may be mentioned principally those of the anthraquinone series. As other vattable compounds there may be mentioned those of the perinone-series or peri-dicarboxylic acid imide series. The vattable compounds must contain at least one hydrophilic group, for example, one or more hydroxyl, amino, hydroxyalkylamino, quaternary ammonium, sulfonamide or methyl-sulfone groups, and especially carboxylic acid or sulfonic acid groups. The compounds used in this process also contain at least one group capable of being chemically fixed, that is to say, a group capable of reacting with the hydroxyl groups of the polyhydroxylated material to form a stable chemical bond. As such groups there may be mentioned more especially those which contain at least one mobile halogen atom.

Of special interest are dyestuffs which contain a group of the formula

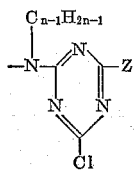

in which $n$ is a whole number not greater than 5, Z represents a chlorine atom or a hydroxyl, alkoxy, or amino group which may be substituted by an alkyl, hydroxyalkyl, for example, hydroxyethyl, group or by a colorless or colored aryl residue, especially one containing a group imparting solubility in water.

As an example of a colorless aryl radical there may be mentioned the benzene radical, and as an example of a colored aryl radical there may be mentioned an arylamino-anthraquinone radical.

The dyestuffs used in the process of the invention are made by methods in themselves known, for example, by reacting a vattable compound, which contains a hydrophilic group and a reactive amino group, with a compound which contains at least two mobile halogen atoms, and, if desired, replacing a mobile halogen atom in the compound so obtained by another substituent, the starting materials being so selected that at least one component contains a hydrophilic group, and the conditions being such that the final dyestuff still contains a mobile halogen atom.

The dyestuffs so obtained can be used for impregnating on a foulard or dyeing in a dyebath cellulosic materials or synthetic fibres, for examples, regenerated cellulose or viscose, or natural materials such as linen or above all cotton. For this purpose there are advantageously used aqueous solutions of the dyestuffs. Cotton may also be dyed with the aforesaid dyestuffs by the known pad roll method, in which the goods, after being foularded are wound on a roller and dyed thereon for a long time while slowly rotating the goods at the desired temperature.

The dyeing can usually be carried out with advantage at temperatures below those customary in dyeing cotton, for example, below 90° C., for example, at about 50° C. In order to exhaust the dyebath it is of advantage to add to the dyebath, if desired in portions, a more or less neutral and preferably inorganic salt, such as an alkali chloride or sulfate, simultaneously with the dyestuff or during the dyeing process. During the dyeing process the dyestuff containing the labile group reacts with the cellulosic material to be dyed, on which the dyestuff is fixed probably by a chemical bond. In order to assist this fixing process during or at the beginning of the dyeing process the dyebath may be rendered distinctly alkaline by the addition of an alkali, for example, by the addition of sodium carbonate, potassium carbonate or a solution of caustic alkali. Furthermore, the pH value of an initially weakly acid to neutral or weakly alkaline dyebath may be gradually increased during the entire dyeing process or, after applying the dyestuff to the material to be dyed, the material may be treated, if desired after being dried, in a fresh alkaline bath in order to fix the dyestuff.

As reducing agents there may be used strong reducing agents, such as sodium hydrosulfite or weaker reducing agents, such as sodium sulfide, sodium hydrosulfide or glucose. The proportion of the reducing agent may vary within wide limits. In most cases it is sufficient to use a considerably smaller quantity of reducing agent than is usually necessary for dyeing with vat dyestuffs or sulfur dyestuffs.

The reducing agent may be added at the outset, halfway through or towards the end of the dyeing process.

Instead of preparing the dyebath by taking up the vattable compound, reducing agent, and, if desired, more or less neutral inorganic salt in water simultaneously or separately in succession, the dyestuff and the salts may be worked up into a paste-like preparation or advantageously a dry preparation. As some of the vattable compounds used in the process are somewhat sensitive towards alkalies owing to their content of labile substituents, it is of advantage to incorporate in the preparations as small a quantity as possible of salts having an alkaline reaction in water. In the case of certain of the vattable compounds defined above there may be incorporated with the preparations, instead of or in addition to the salt, a non-electrolyte such as urea.

By the process of this invention there are produced on polyhydroxylated materials, especially cellulosic textile materials, dyeings or prints having excellent properties of wet fastness and a very good fastness to light.

As compared with the traditional vat dyeing process, the process of the present invention has the advantage of being simpler to operate, because the vatting that precedes dyeing is dispensed with and the process is largely independent of temperature.

The following examples illustrate the invention, the parts and percentages being by weight:

Example 1

2 parts of the dyestuff of the probable formula

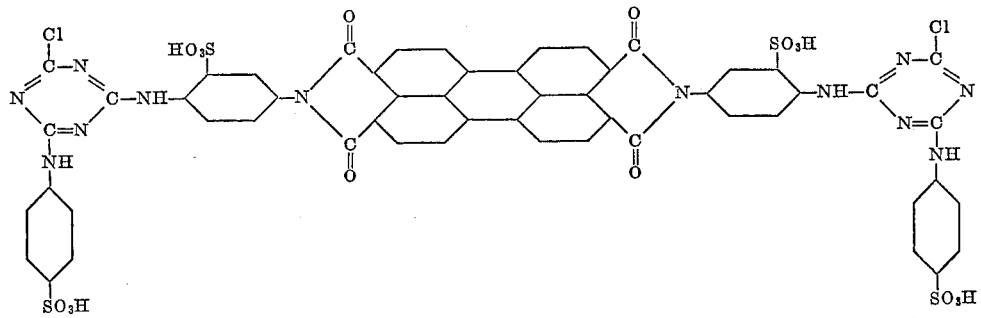

are dissolved in 2000 parts of water. 20 parts of trisodium phosphate and 250 parts of sodium chloride solution of 20% strength are added. 100 parts of well wetted cotton satin are entered into the dyebath at 20–25° C. In the course of 20 minutes the temperature is raised to 50–60° C. and then a further 250 parts of sodium chloride solution of 20% strength are added. After a dyeing period of 30 minutes, 5 parts of sodium hydrosulfite are added and dyeing is continued for a further 45 minutes at 50–60° C. The red-violet dyeing is then reoxidized in the air or by thoroughly rinsing it in a dilute aqueous solution of an oxidizing agent, for example, hydrogen peroxide or sodium perborate. The material is then soaped for 15 minutes at the boil with a non-ionic detergent, rinsed in cold water, and dried. There is obtained a blue-red dyeing of good fastness to washing.

Instead of trisodium phosphate, there may be used sodium carbonate or caustic soda solution.

There may also be used as reducing agent glucose, sodium hydrosulfide or sodium sulfide.

The dyestuff used in this example can be prepared in the manner described in patent application Serial No. 720,528, filed March 11, 1958 (now U.S. Patent No. 2,914,531), by condensing the compound of the formula

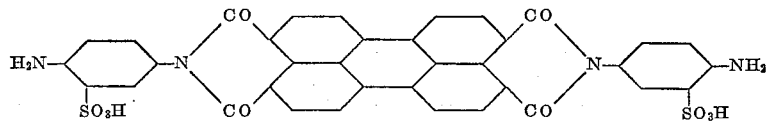

with 2:4 - dichloro - 6 - phenylamino - 1:3:5 - triazine - 4'-sulfonic acid in aqueous solution with the addition of sodium carbonate.

Example 2

2 parts of the dyestuff of the formula

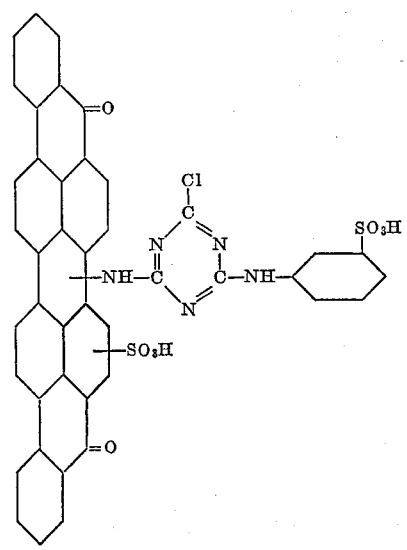

are used for dyeing in a manner analogous to that of the dyestuff of Example 1. There is obtained a grey dyeing of good fastness to washing.

The dyeings obtained as described in Example 1 and 2 shows a distinctly better yield of dyestuff than the corresponding dyeings produced without the use of a reducing agent.

The dyestuff used in Example 2 can be made in the manner described in patent application Serial No. 682,599, filed September 9, 1957, by Jakob Brassel et al. by condensing the corresponding amino-dibenzanthrone sulfonic acid with 2:4-dichloro-6-phenylamino-1:3:5-triazine-3'-sulfonic acid in the presence of sodium carbonate in aqueous solution.

Example 3

2 parts of the dyestuff of the formula

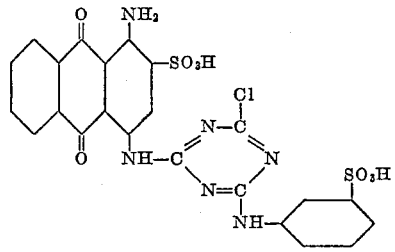

are used for dyeing in a manner analogous to the dyestuff described in Example 1, with the exception that the dyeing temperature is raised in the course of 30 minutes from 20–25° C. to 80–85° C. and that the reducing agent, consisting of 3.5 parts of calcined sodium sulfide, is added to the dyebath at the outset with the alkali. There is obtained a violet dyeing.

The dyestuff used in this example can be prepared in the manner described in patent application Serial No. 682,599, filed September 9, 1957, by Jakob Brassel et al. by condensing 1:4-diaminoanthraquinone-2-sulfonic acid with 2:4 - dichloro-6-phenylamino - 1:3:5 - triazine-3'-triazine-3'-sulfonic acid in aqueous solution with the addition of sodium carbonate.

Example 4

2 parts of the dyestuff of the formula

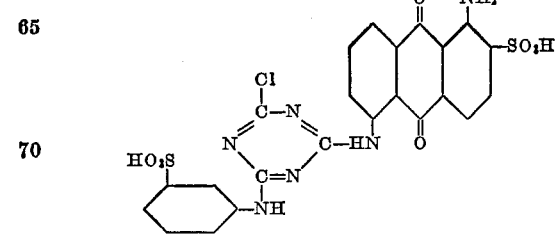

are used for dyeing in the manner described in Example 3. There is obtained a salmon colored dyeing.

The dyestuff used in this example can be prepared in the manner described in patent application Serial No. 682,599, filed September 9, 1957, by Jakob Brassel et al. by condensing 1:5-diaminoanthraquinone-2-sulfonic acid with 2:4-dichloro-6-phenylamino-1:3:5-triazine-3'-sulfonic acid in aqueous solution with the addition of sodium carbonate.

*Example 5*

2 parts of the dyestuff of the formula

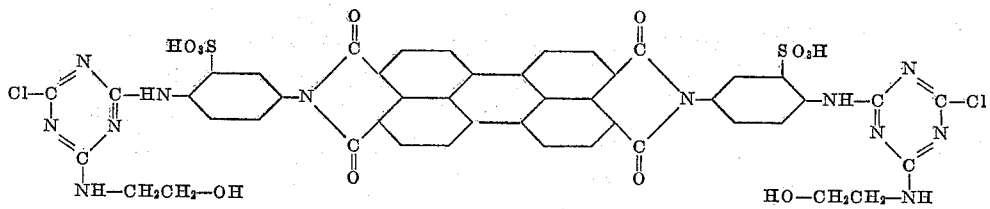

are used for dyeing in manner analogous to that of the dyestuff of Example 1. There is obtained a strong red dyeing of very good fastness to washing and chlorine.

The above dyestuff can be made in the manner described in patent application Serial No. 720,528, filed March 11, 1958, by reacting the condensation product of the formula

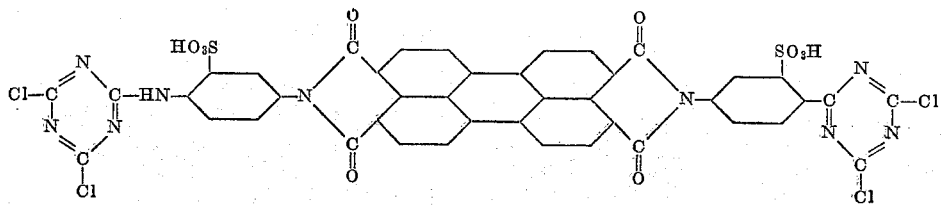

with ethanolamine in aqueous solution.

*Example 6*

2 parts of the dyestuff of the formula

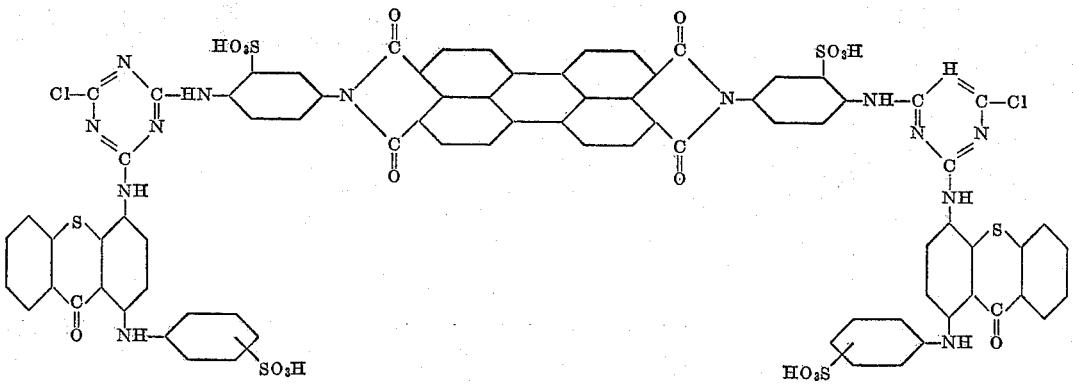

are used for dyeing in a manner analogous to that of the dyestuff in Example 1. There is obtained a red-orange dyeing of good fastness to washing and light.

The dyeings obtained as described in Examples 5 and 6 are considerably deeper in tint and purer in shade than the corresponding dyeings produced without the use of a reducing agent.

The dyestuff used in Example 5 can be made in the manner described in patent application Serial No. 720,528, filed March 11, 1958, by condensing the product of the formula

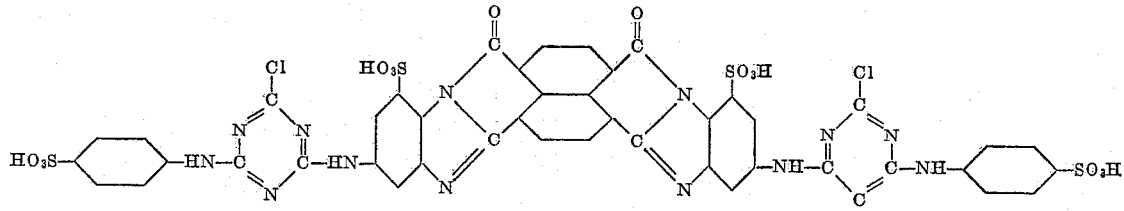

with 1-phenylamino-4-amino-thioxanthone sulfonic acid in aqueous solution with the addition of sodium carbonate.

*Example 7*

2 parts of the dyestuff of the formula

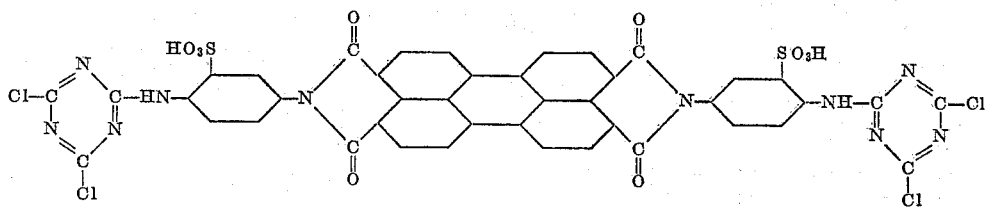

are used for dyeing in a manner analogous to that of the dyestuff of Example 1. There is obtained a brown dyeing of very good fastness to washing.

The dyestuff used in this example can be prepared in the manner described in patent application Serial No.

720,528, filed March 11, 1958, by condensing the product of the formula

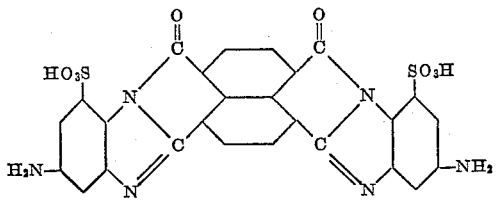

with 2:4-dichloro-6-phenylamino-1:3:5-triazine-4'-sulfonic acid in the presence of sodium carbonate.

Example 8

3 parts of the dyestuff of the probable formula

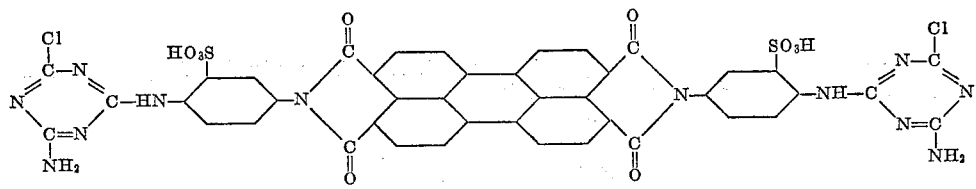

are dissolved in 100 parts of water. A cotton fabric is impregnated with the cooled solution in such manner that its weight increases by 75%, and the fabric is then dried.

The fabric is then impregnated with a solution, at 40° C., which contains, per liter, 10 grams of sodium hydroxide, 300 grams of sodium chloride and 30 grams of sodium hydrosulfite, the fabric is squeezed to a weight increase of 75%, and the dyeing is steamed for 60 seconds at 100-101° C., then thoroughly rinsed in cold water, treated in a sodium bicarbonate solution of 0.5% strength, rinsed, soaped for 20 minutes at the boil in a solution of 0.3% strength of a non-ionic detergent, rinsed and dried. There is obtained a red dyeing which is fixed fast to boiling.

There may also be used as reducing agent glucose or sodium sulfide.

Instead of using the above bis-(monochlorotriazine) compound the same good result can be obtained by using the corresponding bis-(dichlorotriazine) compound.

Example 9

2 parts of the dyestuff obtained as described in Example 8 are mixed with 20 parts of urea and dissolved in 24 parts of water, and the mixture is stirred in 40 parts of a sodium alginate thickening of 5% strength. There are then added 9 parts of a sodium carbonate solution of 10% strength, 2 parts of sodium hydrosulfite and 1 part of a 10 N-solution of caustic soda.

A cotton fabric is printed with the resulting printing color, then dried, steamed for 7 minutes at 100-101° C., thoroughly rinsed in water, and soaped for 20 minutes at the boil in a solution of 0.3% strength of a non-ionic detergent. There is obtained a bright red print which is fixed fast to boiling.

Example 10

2.5 parts of the dyestuff of the probable formula

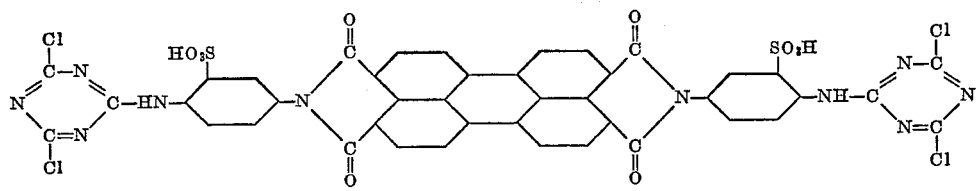

are dissolved in 100 parts of water. A cotton fabric is impregnated with the resulting solution, squeezed to a weight increase of 75%, and dried. The dyeing is then fixed by treating the fabric for 45 minutes on a jigger in a solution, at 80° C., which contains, per liter, 10 grams of sodium hydroxide, 300 grams of sodium chloride and 30 grams of sodium hydrosulfite. The fabric is then thoroughly rinsed in water, soaped for ¼ hour at the boil in a solution of 0.3% strength of a non-ionic detergent, rinsed and dried. There is obtained a red dyeing of good fastness to washing.

Instead of using the above bis-(dichlorotriazine) compound, the same good result can be obtained with the corresponding bis-(monochlorotriazine) compound.

Example 11

2 parts of the dyestuff of the formula

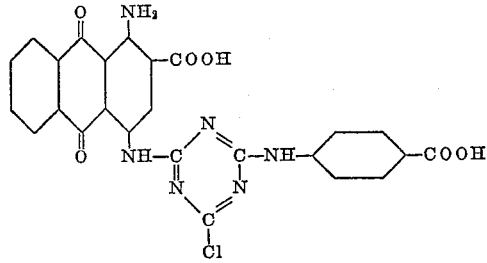

are used for dyeing in the manner described in Example 3. There is obtained a reddish blue dyeing of very good fastness to washing and light.

The dyestuff used in this example can be made as described in patent application Serial No. 682,599, filed September 9, 1957, by Jakob Brassel et al. by the reaction of 1:4-diaminoanthraquinone-2-carboxylic acid with the monocondensation product of cyanuric chloride and 4-aminobenzoic acid.

What is claimed is:

1. A process for dyeing and printing cellulose textile materials with a vat dyestuff of the formula

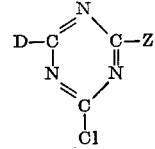

in which D represents the radical of a vattable amine bound to the triazine nucleus through its nirogen atom and containing at least one acid group imparting solubility in water, Z represents a member selected from the group consisting of a chlorine atom, an amino group, a substituted amino group, a hydroxy group and a substituted hydroxy group, and $n$ is a whole number of at most 5, which process is carried out in the presence of a reducing agent selected from the group consisting of an alkali hydrosulfite, an alkali sulfide, an alkali hydrosulfide and glucose, and an alkali selected from the group

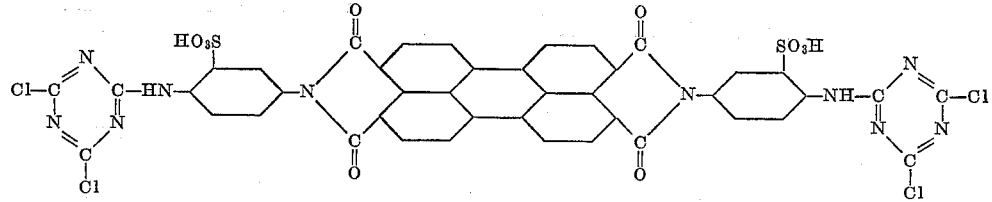

consisting of an alkali hydroxide, an alkali carbonate and an alkali phosphate.

2. A process for dyeing and printing cellulose textile materials with the dyestuff of the formula

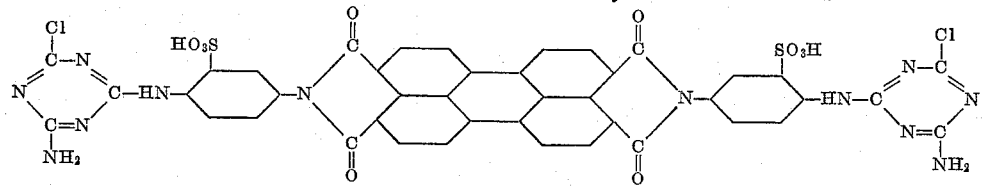

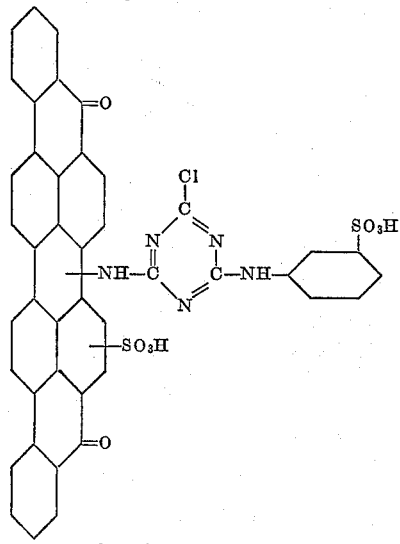

in the presence of sodium hydrosulfite as reducing agent, trisodium phosphate as alkali and sodium chloride.

3. A process for dyeing and printing cellulose textile materials with the dyestuff of the formula

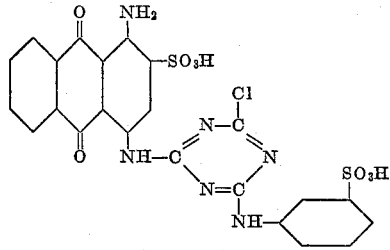

in the presence of sodium sulfide as reducing agent, trisodium phosphate as alkali and sodium chloride.

4. A process for dyeing and printing cellulose textile materials with the dyestuff of the formula

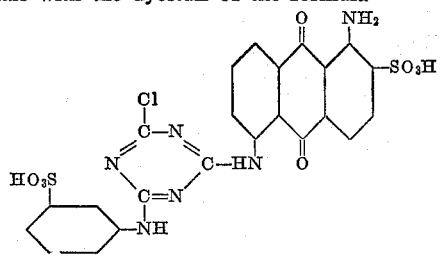

in the presence of sodium sulfide as reducing agent, trisodium phosphate as alkali and sodium chloride.

5. A process for dyeing and printing cellulose textile materials with the dyestuff of the formula

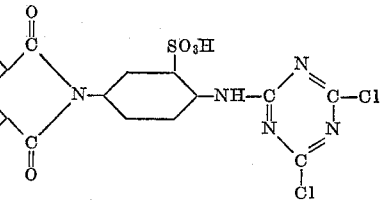

in the presence of sodium hydrosulfite as reducing agent, trisodium phosphate as alkali and sodium chloride.

6. A process for dyeing and printing cellulose textile materials with the dyestuff of the formula

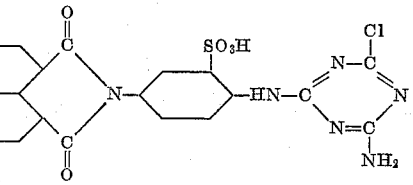

in the presence of sodium hydrosulfite as reducing agent, sodium hydroxide as alkali and sodium chloride.

7. In a process for dyeing and printing cellulose textile materials with a dyestuff of the formula

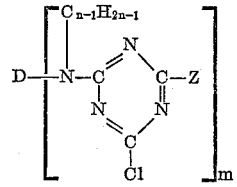

in which D represents the radical of a vat dyestuff which contains 1 to 4 hydrophilic groups, $m$ represents a whole number up to 2, Z represents a member selected from the group consisting of a chlorine atom, an amino group, a substituted amino group, a hydroxy group and a substituted hydroxy group, and $n$ is a whole number of at most 5, in the presence of an alkali, the improvement which consists of carrying out the process in the presence of a reducing agent selected from the group consisting of an alkali hydrosulfite, an alkali sulfide, an alkali hydrosulfide and glucose.

8. A process for dyeing and printing cellulose textile materials with a vat dyestuff which contains 2 to 4 acid groups imparting solubility in water and corresponds to the formula $$K\!-\!\!\left[\!N\!-\!\!\underset{\underset{\text{Cl}}{\overset{\text{C}_{n-1}H_{2n-1}}{|}}}{\overset{\text{C}_{n-1}H_{2n-1}}{|}}\!\!-\!C\!\!\underset{N}{\overset{N}{\diagup\!\!\!\diagdown}}\!\!C\!-\!Z\right]_m$$

in which K is the radical of a peri-tetra-carboxylic acid diimide containing at least two of the aforesaid groups imparting solubility in water, $m$ represents a whole number up to 2, Z is a member selected from the group consisting of Cl, $NH_2$, substituted amino, hydroxy and substituted hydroxy, and $n$ is a whole number of at most 5, which process is carried out in the presence of (a) a reducing agent selected from the group consisting of an alkali hydrosulfite, an alkali sulfide and glucose, (b) an alkali selected from the group consisting of an alkali hydroxide, an alkali carbonate and an alkali phosphate, and (c) a water-soluble inorganic salt.

References Cited in the file of this patent

UNITED STATES PATENTS

| | | |
|---|---|---|
| 1,523,308 | Steinbuch et al. | Jan. 13, 1925 |
| 1,832,425 | Remlein | Nov. 17, 1931 |
| 1,886,480 | Haller et al. | Nov. 8, 1932 |
| 1,888,631 | Kunz et al. | Nov. 22, 1932 |
| 2,773,871 | Brassel et al. | Dec. 11, 1956 |
| 2,914,531 | Staeuble et al. | Nov. 24, 1959 |